United States Patent
Iyer et al.

(10) Patent No.: US 7,099,666 B1
(45) Date of Patent: Aug. 29, 2006

(54) AUTOMATED RECONCILIATION OF DIRECTED RETRY LISTS

(75) Inventors: Gopal N. Iyer, Boca Raton, FL (US); Christopher G. Dinges, Lake Worth, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 614 days.

(21) Appl. No.: 09/918,754

(22) Filed: Jul. 30, 2001

(51) Int. Cl.
*H04Q 7/20* (2006.01)

(52) U.S. Cl. .................. 455/434; 455/561; 370/254

(58) Field of Classification Search ............... 455/433, 455/434, 442, 436, 560, 561, 552.1, 553.1; 370/254, 395.2; 342/165
See application file for complete search history.

(56) References Cited

U.S. PATENT DOCUMENTS

| | | | | |
|---|---|---|---|---|
| 5,335,355 A | * | 8/1994 | Tanaka et al. | 455/553.1 |
| 5,873,046 A | * | 2/1999 | Bronner | 455/553.1 |
| 5,940,384 A | * | 8/1999 | Carney et al. | 370/347 |
| 5,963,869 A | * | 10/1999 | Fehnel | 455/511 |
| 6,285,874 B1 | * | 9/2001 | Magnusson et al. | 455/456.1 |
| 6,324,572 B1 | * | 11/2001 | Silverman et al. | 709/215 |
| 6,529,732 B1 | * | 3/2003 | Vainiomaki et al. | 455/433 |
| 6,675,024 B1 | * | 1/2004 | Loke et al. | 455/553.1 |

* cited by examiner

*Primary Examiner*—Charles N. Appiah
*Assistant Examiner*—Nghi Ly
(74) *Attorney, Agent, or Firm*—Merchant & Gould (57) ABSTRACT

A reconciliation system automatically updates cell face transfer data in one form to match cell face transfer data in another form. The system includes an automatic read and comparison module for reading cell face transfer data from one form and automatically comparing the cell face transfer data to the data in another form. An automatic modification module automatically changes cell face transfer data entries in one form to match data in entries of another form.

3 Claims, 8 Drawing Sheets

AUTOMATED RECONCILIATION OF DIRECTED RETRY LISTS

FIELD OF THE INVENTION

The present invention generally relates to cellular communications. More particularly, the present invention relates to reconciling cell face transfer data in directed retry lists.

BACKGROUND OF THE INVENTION

With the increasing popularity of cellular phone communications, managing the calls to and from cellular phones has become increasingly complex. Cellular phone systems typically include a cell face (or antenna) mounted on an antenna tower receiving calls from cell phones. Typically, a cell face receives calls within an associated geographic coverage area called a cell. An antenna tower can have multiple cell faces oriented at different angles to handle calls originating from multiple directions around the antenna tower. A process is employed in order to choose a cell face that handles the call from each cell phone.

The process of selecting and switching among cell faces involves the use of data that designates available cell faces. This data is referred to herein as cell face transfer data. One form of cell face transfer data known in the industry is a Directed Retry List (DRL). The DRL cell face data is typically used to select a cell face when a call is attempted from a cell phone. When the call is placed, if all the channels of an initially selected cell face are being used or if the signal strength is weak, the caller will get a busy signal, indicating that no channels are available to carry the call. When the caller gets a busy signal, the call is lost. To maximize revenue, the phone company must minimize the occurrence of lost calls. The DRL is used to minimize the number of lost calls. If the call signal strength is weak, the DRL is accessed to select another cell face in the same vicinity. As another example, if all of the radios of a cell face are in use and the cell face cannot handle an incoming call, the DRL is accessed to select a cell face in the area that can handle the call. Because of factors such as voice channel blocking or weak signal strength, a call may be denied service at a cell site. A DRL offers an additional chance for success to setup attempts that are denied service. When the DRL is active at a cell site, the cell site directs the cell phone to retry its setup attempt at another cell site in the near vicinity.

One problem with the current approach is that cell face transfer data is updated manually. Cell face transfer data must be updated when a new cell site is built providing new cell faces. The new cell site and cell faces affect existing cell face transfer data, particularly for adjacent cells. The current approach to updating cell face transfer data is to manually enter the new cell site and cell face transfer data into a database. Manual entry of the data is time consuming. Adding to the problem of manual entry are multiple cell face transfer data formats. The effort and time required for manual entry is compounded when multiple cell face transfer data formats are used. Data entry personnel must first enter the data in one cell face transfer data format and reenter the same data in other cell face transfer data formats.

With the advancement of telecommunications, numerous technologies are now used. Multiple forms of cell face transfer data have been developed and are used to provide data specifically designed for each of the technologies. For example, a form known as Cell Equipage Face (CEQFACE) is typically used in conjunction with the Advanced Mobile Phone Service (AMPS) technology, while a form called Reselection (RESEL) is used with Time Division Multiple Access (TDMA). A number of problems have emerged as a result of multiple cell face transfer data formats.

Another problem is that data is often entered only in one cell face transfer data format associated with one technology. Thus, new available cell face data is frequently not available in all technologies. For example, typically CEQFACE forms are updated with new cell face information, but RESEL forms are not updated. As a result, cell faces that are available for TDMA users are often not selectable because those cell faces are not in the RESEL cell face transfer data. Thus, available cell faces are not used efficiently. Manual data entry is also error prone. Errors become even more likely when the data entry personnel must reenter the same data multiple times in multiple formats. Consequently, errors in the cell face transfer data can result in cell faces being used that are inappropriate for a call. When cell face transfer data is updated only in one format or errors are made during data entry, the cell face transfer data in each of the formats is different.

Therefore, there is a need in the art for an automated system and method for reconciling cell face transfer data in different forms, thereby enabling more efficient and effective use of cellular antennas. Preferably, the system and method will conform to one or more Directed Retry List (DRL) forms, such as CEQFACE or RESEL, and will enable selection and hand off to cell faces.

SUMMARY OF THE INVENTION

Embodiments of the present invention automatically reconcile cell face transfer data in two or more formats. After cell face transfer data is entered in a standard format, other formats may be automatically compared with it. Cell face transfer data that differs from the standard format can be automatically updated to match the data in the standard format. Automatic update saves time and prevents errors in cell face data entry.

An embodiment includes a method of reconciling receiver transfer data in a first format with receiver transfer data in a second format by comparing an entry of the first format an entry in the second format, and automatically modifying the first format entry if receiver transfer data of the second format entry is not included in first format entry.

An embodiment includes a method of automatically reconciling a first directed retry list with a second directed retry list by determining if the second directed retry list is a standard form, and modifying the first directed retry list if the second directed retry list is the standard form. To modify the first directed retry list, the embodiment may determine if the first directed retry list does not include an available cell face identifier of the second directed retry list, and add the available cell face identifier of the second directed retry list to the first directed retry list if the available cell face identifier is not included in the first directed retry list. The method may also involve replacing a no indicator with a yes indicator in the Reselection List form where the first directed retry list is a Reselection List form and the second directed retry list is a Cell Equipage Face form.

Yet another embodiment is a cellular phone system having a database with cell face transfer data in a first format and cell face transfer data in a second format, and a reconciling system operative to automatically reconcile the first format with the second format.

The various aspects of the present invention may be more clearly understood and appreciated from a review of the

DETAILED DESCRIPTION

The invention is described in detail below with reference to the figures. When referring to the figures, like structures and elements shown throughout are indicated with like reference numerals.

Figure 1:
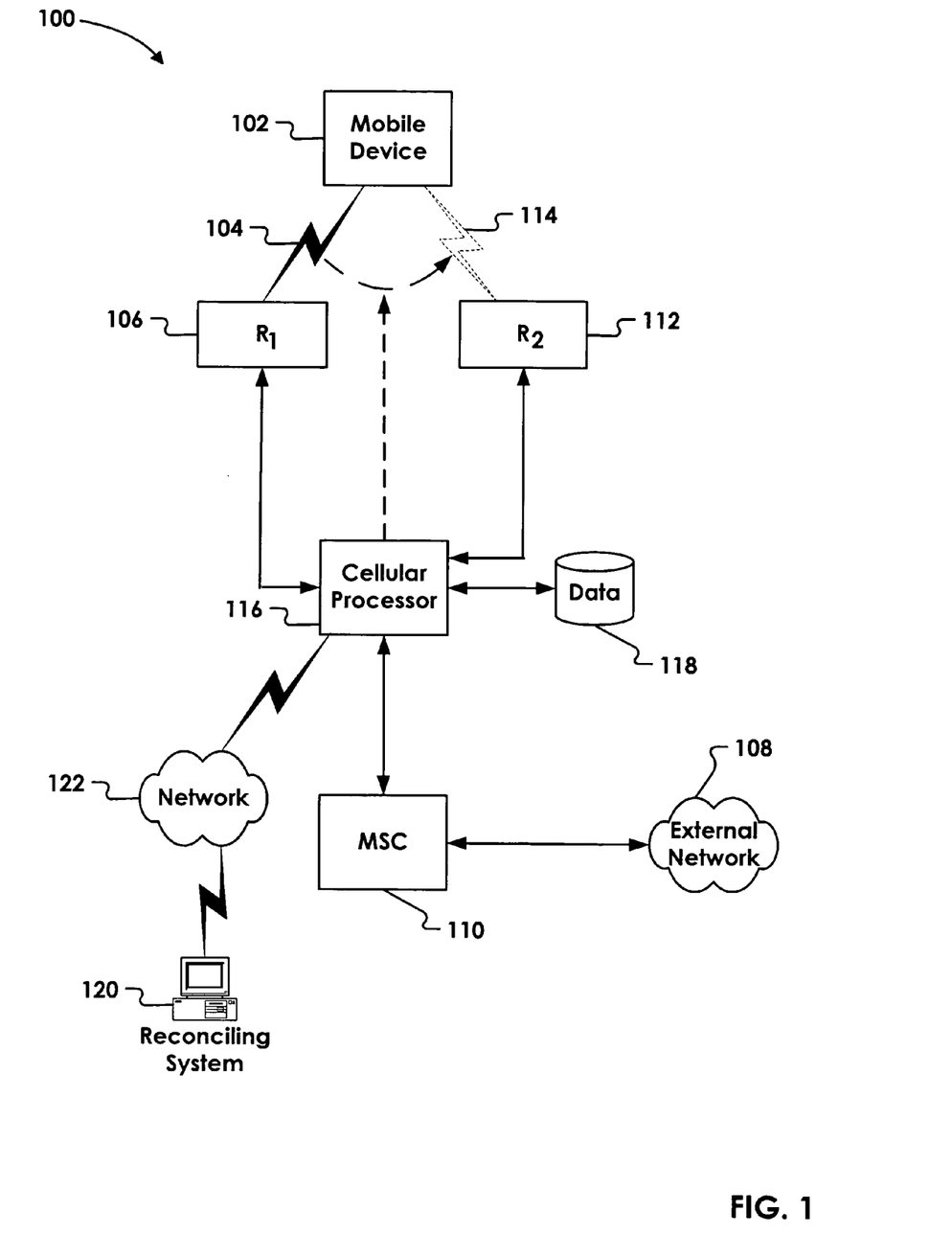
FIG. 1 is an exemplary operating environment implementing an embodiment of the present invention.

FIG. 1 illustrates an exemplary operating environment 100 using an embodiment of the present invention. The operating environment 100 includes a mobile device 102 transmitting a signal 104 to a receiver $R_1$ 106. The receiver $R_1$ 106 receives the signal 104 so that the signal can be communicated to an external network 108. The receiver $R_1$ 106 communicates with cellular processor 116, which communicates with a mobile switching center (MSC) 110. The MSC 110 switches the signal 104 onto the external network 108. The mobile device 102 can be any mobile communications device including, but not limited to, a cellular telephone, a personal digital assistant (PDA), a laptop computer, or a radio transmitter/receiver. The external network 108 is any external communications network including, but not limited to, a wire line phone network. Typically, the mobile device 102 is moving as it transmits the signal 104 to the receiver $R_1$ 106. As the mobile device 102 moves, the signal strength of the signal 104 will vary with respect to the receiver 106. Typically, as the mobile device 102 moves away from the receiver 106, the signal strength of the signal 104 weakens.

As the mobile device 102 moves, it may move away from the receiver $R_1$ 106 and may move closer to a receiver $R_2$ 112. The cellular processor 116 monitors the signal strength of signal 104. As the mobile device 102 moves farther from the receiver 106 and closer to the receiver 112, the signal strength of the signal 104 typically becomes weaker with respect to the receiver 106. The cellular processor 116 monitors the signal strengths of the signal 104 and the signal 114 and determines that the receiver 112 is receiving a more powerful signal then the receiver $R_1$ 106. The cellular processor 116 sends a signal to a radio transmitter associated with receiver $R_1$ 106 to instruct the mobile device 102 to transfer from receiver 106 to receiver 112. The mobile device 102 transfers to the receiver 112 typically by transmitting another signal 114 at a transmission frequency recognizable by the receiver 112.

In other words, while the signal strength of the signal 104 is greater than a minimum value, the signal 104 will be switched onto the external network 108 via receiver 106. However, when the signal strength of the signal 104 falls below the minimum level, the signal 114 will be received by receiver 112 and switched onto the external network 108. Stated another way, for some time period the receiver 106 may be optimal for receiving a call from the mobile device 102. As the mobile device 102 moves over time, the receiver 112 may become optimal for receiving calls from the mobile device 102. The cellular processor makes a decision as to whether receiver 106 is optimal or whether the receiver 112 is optimal for receiving calls from the mobile device 102. Typically, the cellular processor 116 accesses a database 118 that contains a list of receivers where a call can be transferred from the receiver 106. In the exemplary embodiment of FIG. 1, cellular processor 116 will identify the receiver 112 as being available to receive a call from the mobile device 102. Stated differently, cellular processor 116 will find the receiver 112 in a list associated with the receiver 106 and will determine that the signal 104 can be transferred to the signal 114. Consequently, the cellular processor facilitates a transfer from the receiver 106 to the receiver 112.

With respect to the mobile device 102, the mobile device 102 may transmit signals in any of a number of protocols known in the art. For example, the signal 104 may be an analog signal or it may be a digital signal. The signal 104 may further be transmitted at any of a number of frequencies. The receiver 106 can typically receive signals having different protocols. For example, the receiver 106 can receive an analog signal or a digital signal. Similarly, receiver 112 can receive analog or digital signals. Data in the database 118 may be in one form for one communications protocol, and may be in another form for another communications protocol. The cellular processor 116 determines which protocol is being transmitted by the mobile device 102 in order to determine which form in the database 118 should be used. As the mobile device 102 moves from the receiver 106 to the receiver 112, the cellular processor 116 monitors the signal strength as discussed earlier. When the signal strength of the signal 104 is below the minimum power level, the cellular processor 116 determines the protocol of the signal 104. Based on that determination, the cellular processor 116 chooses a form containing receiver transfer data in the database 118 to identify a receiver to switch to. For example, if the signal 104 and the signal 114 are analog signals, the cellular processor 116 will access a form in the database 118 that is designed for the analog protocol. On the other hand, if the signals 104 and 114 are in a digital protocol, the cellular processor 116 accesses a form in the database 118 designed for the digital protocol.

From time-to-time, data in the database 118 is updated. The data may be updated for a variety of reasons, including, but not limited to, the availability of receivers in the area of the mobile device 102. For example, the receiver 112 may need repairs. As a result of the repairs, the receiver 112 may be unavailable for some time. The data in the database 118 may be updated to reflect the fact that the receiver 112 is unavailable. Referring to the earlier example, if the receiver 112 is unavailable and the database 118 has been updated to reflect the unavailability, as the mobile device 102 moves from the receiver 106 to the receiver 112, the cellular processor 116 will not identify the receiver 112 as available for transfer when the cellular processor 116 accesses the database 118. As was discussed earlier, the database 118 may have different forms for different communications protocols. For a number of reasons, the data in the different forms is often different in substance as well as different in format. For example, a form associated with an analog protocol may have the receiver 112 listed as an available transfer receiver, while the form for the digital protocol may not have the receiver 112 listed. When data in different forms is mismatched, the forms need to be reconciled, or updated so that the data matches.

Advantageously, the reconciling system 120 automatically reconciles the data in the different forms by updating one form to match another form. Preferably, the reconciling system 120 can reconcile receiver transfer data in the database 118. The reconciling system 120 is typically a computer, such as, but not limited to, a desktop personal computer, a laptop computer, or a workstation connected to a server. The reconciling system 120 communicates to the cellular processor 116 via a communications network 122. The network 122 may be any form of network known in the art including, but not limited to, Internet, intranet, or wireless.

The reconciling system 120 implements an embodiment of the present invention. An embodiment can be an executable program running on the reconciling system 120 that automatically reconciles data in two different forms on the database 118. The embodiment of the present invention accesses forms on the database 118 via the network 122 and the cellular processor 116. Differences in the data of two different forms are identified. One of the forms is updated with the data in another form. After the data in the forms of the database 118 are reconciled, available transfer receivers are the same for each of the different forms. As a result, the available transfer receivers are available to mobile devices 102 utilizing different communications technologies. For example, before reconciliation of the forms in the database 118, the receiver 112 may be listed as available in the analog form but may not be listed in the digital form. Thus, before reconciliation, a mobile device 102 utilizing an analog protocol will be switched to the receiver 112 as it gets closer to the receiver 112, but a mobile device utilizing a digital protocol will not be switched to the receiver 112 as the mobile device moves toward the receiver 112. After automatic reconciliation of the forms, receiver 112 is available to both the analog user and the digital user. The method employed to reconcile forms in the database 118 will be discussed in more detail with respect to the embodiments shown in the following figures.

Figure 2:
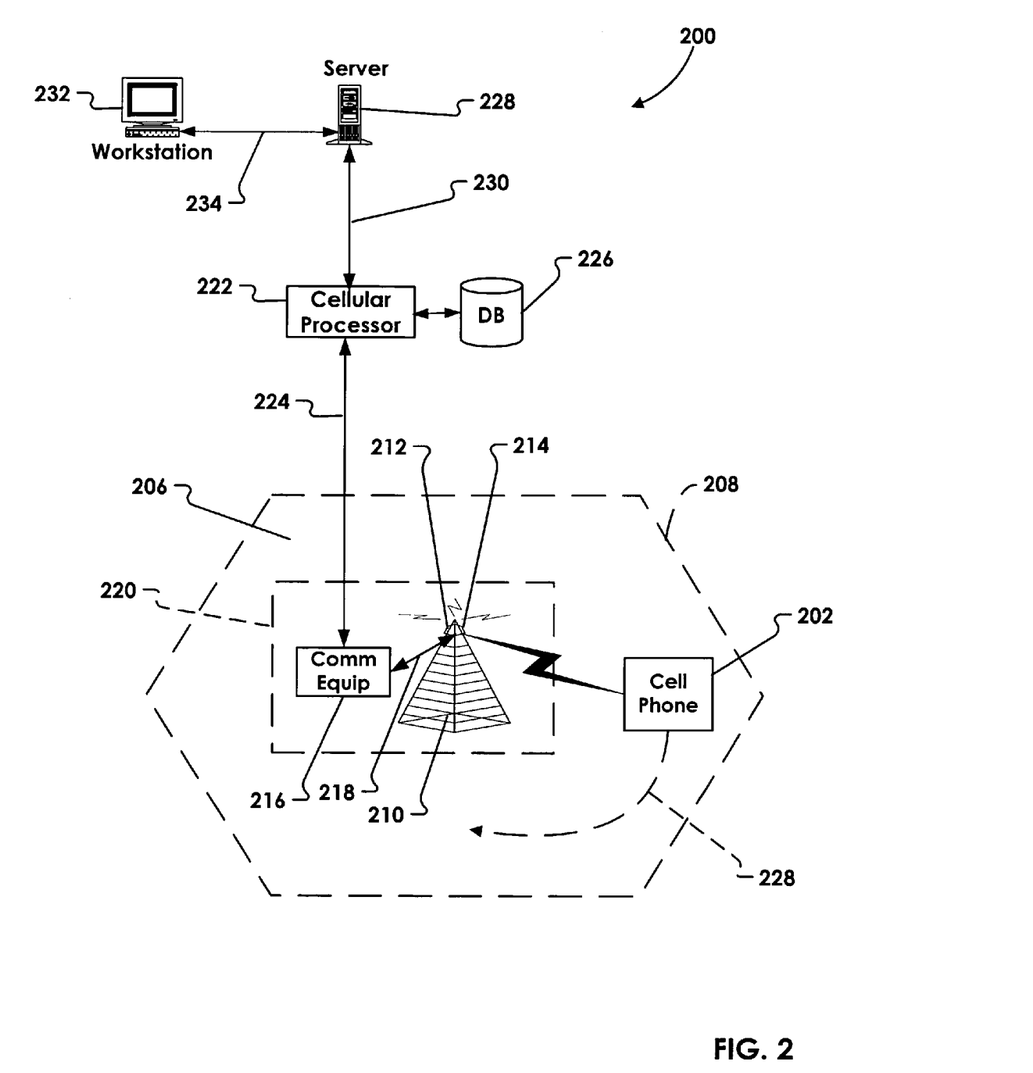
FIG. 2 is a cellular operating environment implementing an embodiment of the present invention.

FIG. 2 illustrates a suitable operating environment 200 utilizing an embodiment of the present invention. The environment 200 is generally a cellular telephone system for receiving and transmitting cellular phone calls. A cellular phone 202 is transmitting a signal 204 within a cell 206. The cell 206 is a geographic area generally defined by a boundary 208. The cell includes an antenna tower 210 that has transmitters and receivers for transmitting and receiving signals. The transmitters on the antenna tower 210 transmit at a designated power level. Likewise, the cell phone 202 transmits the signal 204 at a designated power level. The designated power levels of the antenna tower transmitters and the cell phone 202 dictate the location of the boundary 208 of the cell 206. Receivers on the antenna tower 210 will generally receive the signal 204 while the cell phone 202 is within the boundary 208 of the cell 206. Generally, when the cell phone 202 leaves the boundary 208 of the cell 206, the receiver of the antenna 210 will no longer receive the signal 204. In one embodiment, the cell boundary 208 is substantially hexagonal in shape.

A receiver on the antenna tower 210 is generally referred to as a cell face. The antenna tower 210 may have more than one cell face, such as a cell face 212 and cell face 214. A typical antenna tower has three cell faces, but the number of cell faces can vary. Cell faces have one or more radios for transmitting and receiving cellular signals. Each cell face on the antenna tower 210 is positioned so that it covers an area within the cell 206. Depending on the positioning and the orientation of the cell face 214, the cell face 214 will receive calls coming from a particular direction. The cell face 212 is oriented in a different position to receive calls coming from a different direction with respect to the antenna tower 210. A variety of cell face configurations are known in the art. For example, one cell face configuration is known as the omni face, which comprises a single cell face with a coverage area of 360° around the antenna tower. A common cell face configuration includes three cell faces with each cell face having a coverage area of 120° around the antenna tower. Typically a structure 216 is located near the antenna tower that houses communications equipment, such as radio transmitters, radio receivers, and power supplies. The communications equipment 216 is connected to transmitters and cell faces on the antenna tower via a communications link 218. The structure 216 and the antenna tower 210 are commonly referred to as a base station 220. The base station 220 is located substantially in the middle of the cell 206.

Each cell face on the antenna tower 210 has an associated transmitter. Transmitters transmit control signals on unique control channels or frequencies that are used to send control messages to the cell phone 202. When the cell phone 202 is in operation, the cell phone 202 searches for the strongest control signal coming from the antenna tower 210. The receiver in the cell phone 202 locks on to the strongest control channel and begins receiving control information. The control information includes the transmission frequency at which the cell phone 202 should transmit. In the exemplary environment 200, when the cell phone 202 begins operation, it receives the strongest control signal from a transmitter associated with the cell face 214. Thus, as depicted in FIG. 2, the signal 204 from the cell phone 202 is being received by the cell face 214. The cell phone 202 may transmit using any of a number of communications protocols known in the art. The signal 204 will follow the protocol used by the cell phone 202. For example, the cell phone 202 may utilize an analog protocol known as advanced mobile phone system (AMPS). Alternatively, the cell phone 202 may use a digital protocol, such as time division multiple access (TDMA).

The communications equipment 216 receives the signal 204 and may demodulate the signal. The communications equipment 216 typically is operable to receive signals in a variety of formats, including AMPS and TDMA. The signal 204 is sent to a cellular processor 222 via a communications link 224. The cellular processor 222 is typically a sophisticated computing device operable to manage cellular communications at the antenna tower 210. For example, the cellular processor 222 can monitor the signal strength of the signal 204. Also, the cellular processor 222 can detect when the cell phone 202 has been disconnected to terminate the call 204. The cellular processor 222 may also facilitate billing and locating the cell phone 202. One example of a cellular processor known in the art is the Executive Cellular Processor (ECP) manufactured by Lucent. Many other cellular processors are known in the art. The cellular processor 222 utilizes a database 226 to perform its functions. One particular function that the cellular processor 222 performs is determining which of the cell faces on the antenna tower 210 should optimally be used to receive the signal 204.

The cell phone 204 is transmitting a signal to the cell face 214. The cell phone is moving in a direction 228. When the cell phone initially places a call 204, the cell phone 204 may be located in the coverage area of the cell face 214. While the cell phone 202 moves in a direction 228, the signal strength of the signal 204 will vary with respect to the cell faces 212 and 214. The cellular processor 222 detects the variation in signal strength of the signal 204. As the cell phone 202 moves in the direction 228, it moves away from the cell face 214 and closer to the cell face 212. The cellular processor 222 detects a decrease in the signal power received by the cell face 214. Eventually, as the cell phone 202 continues to move, signal power received by the cell face 214 will be less than a minimum required level. When a call is placed from the cell phone 204, the cellular processor 222 will determine that the signal strength of the call is less than the minimum required level. In either situation, the cellular processor 222 accesses the database 226 to determine which cell face the signal 204 can be transferred to. If, on the other hand, the signal strength is not below the minimum required for cell face 214, but all the radios of cell face 214 are being used by other calls, the cellular processor 222 will access the database 226 to determine which cell face the signal 204 can be transferred to.

The cellular processor 222 accesses cell face transfer data in the database 226. The cell face transfer data is generally a list of cell faces to which a signal may be transferred. For example, the database 226 has cell face transfer data associated with the cell face 214. Cell face transfer data for cell face 214 provides a list of available cell faces where the signal 204 can be transferred. In the example shown in FIG. 2, the cell face 212 is among the available cell faces given in the cell face transfer data for the cell face 214. After the cellular processor 222 identifies the cell face 212 as available for a retry, the cellular processor 222 sends a message to the communications equipment 216 indicating that the cell phone 202 should begin transmitting at a frequency associated with the cell face 212. In response to a message from the cellular processor 222, the transmitter for the cell face 214 transmits a control signal to the cell phone 202 that instructs the cell phone to switch to a frequency associated with the cell face 212. The process of transferring the cell phone signal 204 from the cell face 214 to the cell face 212 is extremely fast. There is no break in the conversation recognizable by the user of the cell phone 202. Transferring a call or signal from one cell face to another typically occurs when the call is attempted and the initial cell face is not available. A cell face typically will not be available for a call if the signal strength of the call does not meet a specified signal strength or all the radios of the cell face are in use.

With respect to the cell face transfer data in the database 226, cell face transfer data is typically in one form for AMPS and a different form for TDMA. Thus, there is an AMPS form for cell face transfer data and a TDMA form for cell face transfer data. While the AMPS form and the TDMA form preferably have the same cell face transfer data, the data is in a different format for each of the forms. In other words, the cell faces that are available to receive a call in a TDMA protocol preferably are the same as the cell faces available in the AMPS protocol. However, frequently the AMPS form and TDMA form differ in the cell face transfer data. The difference may arise when, for example, the AMPS form has been manually updated, but the TDMA form has not been updated. One type of form may be a standard form that is updated consistently when necessary, while other forms are not consistently updated. When the AMPS form has been updated and the TDMA form has not been updated to reflect available cell faces, the two forms can be automatically reconciled using an embodiment of the present invention so that the same cell faces are available in each communications protocol.

In order to automatically reconcile differences in the AMPS form and TDMA form, an embodiment of the present invention is running on a server 228 that is in communication with the cellular processor via a communication link 230. The server preferably includes a reconciliation system that is accessible by a workstation 232 connected to the server via a communication link 234. A user of the workstation 232 can access the reconciliation system running in the server 228 to facilitate automatic reconciliation of the database forms. Cellular processor 222 transfers the AMPS form and the TDMA form from the database 226 to the server 228 via the communication link 230. The reconciliation system accesses the AMPS form and TDMA forms in the server 228. If the AMPS form has been updated but the TDMA form has not, data in the TDMA form is updated to match data in the AMPS form. The cell face transfer data is read from the AMPS form and added to the TDMA form if it is not listed in the TDMA form. For example, if, in the AMPS form, the cell face 212 is listed as an available cell face to receive a call that is attempting to use the cell face 214, but the cell face 212 is not listed in the TDMA form as an available cell face to receive a call that is attempting to use the cell face 214, the cell face 212 is added to the TDMA cell face transfer data for the cell face 214.

Figure 3:
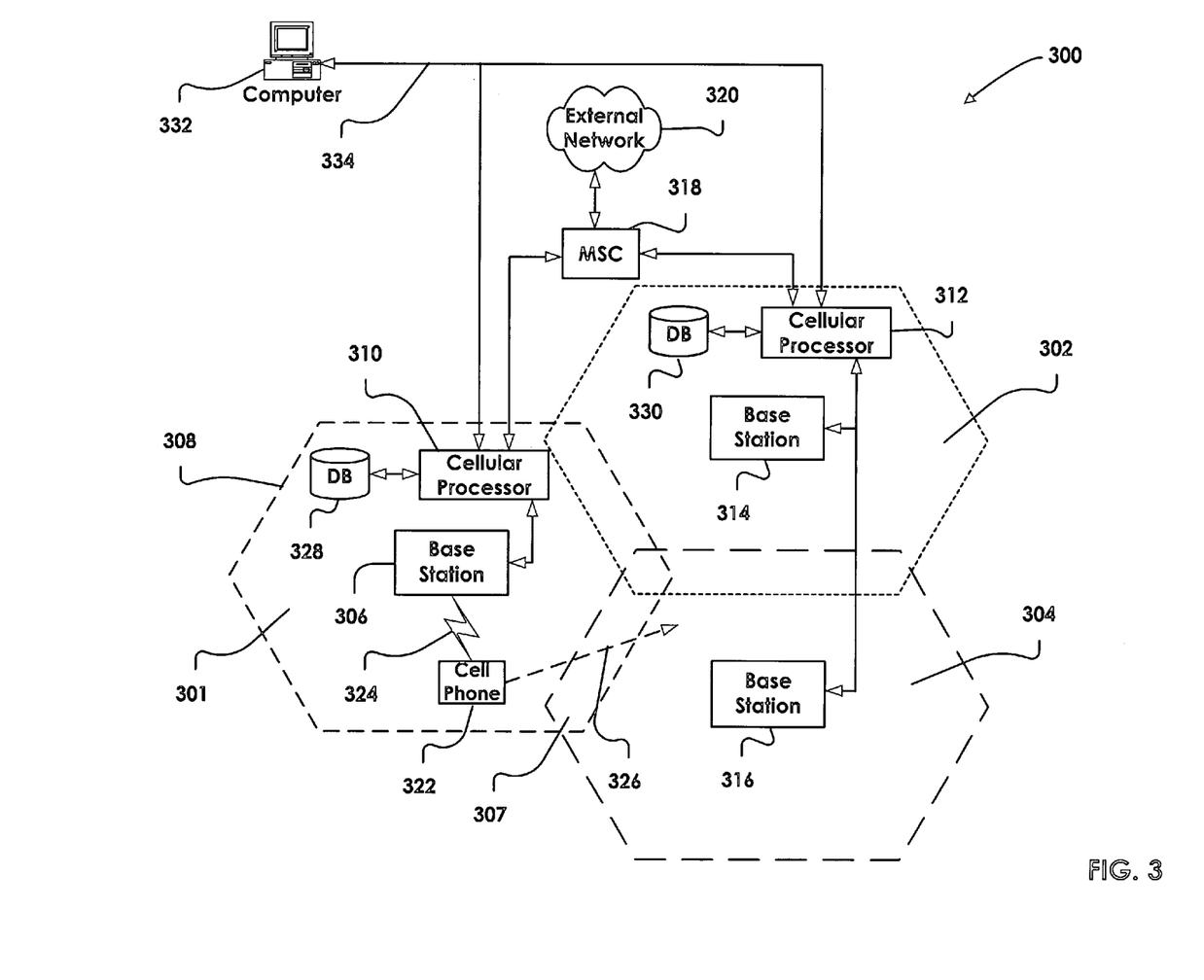
FIG. 3 is a multiple cell operating environment implementing an embodiment of the present invention.

FIG. 3 illustrates an exemplary multiple cell operating environment 300 implementing an embodiment of the present invention. The environment can include one or more cells, such as cell 301, cell 302, cell 304. Cells are often referred to as sites. Typically, each cell has an associated cell identification number used to identify the cell. Each cell has a base station, such as base station 306. The cell 302 has a base station 314 and cell 304 has a base station 316. Like the base station 220 of FIG. 2, the base stations 306, 314, and 316 each include radio equipment and an antenna tower having one or more cell faces. Cells 301, 302 and 304 may, but do not necessarily, overlap, as shown by an overlapping region 307. The cell 301 has a coverage area defined by a substantially hexagonal boundary 308. During operation, a cellular processor 310 communicates with the base station 306 to monitor calls within the cell 301. Another cellular processor 312 communicates with the base station 314 and the base station 316 to monitor calls within cell 302 and cell 304 respectively. A typical cellular processor may be associated with 100 or more cells and base stations. The environment illustrated in FIG. 3 is exemplary only and the systems and methods described can generally be applied to environments including hundreds of cells.

As has been discussed, cellular processors, such as cellular processor 310 and cellular processor 312 typically monitor various data about cellular phone calls, such as signal strength, cell phone location, and billing. The cellular processors 310 and 312 also transmit signals to a mobile switching center (MSC) 318. The MSC 318 relays cell phone signals to an external network 320, such as a telephone wireline network. The MSC 318 is a sophisticated system that is in communication with networks and switches around the world to determine an optimal route for cell phone calls to reach their destination.

In the exemplary environment 300 a mobile communication device, such as a cell phone 322, is shown in the cell 301 transmitting a signal 324 to the base station 306. The signal 324 transmits voice data over a voice channel to a cell face at the base station 306. The base station 306 receives the signal 324 and transmits it to the cellular processor 310 so that the cellular processor 310 can monitor the signal 324. The cellular processor 310 may also transmit the signal 324 to the MSC 318, which may route the signal to the external network 320. The cell phone 322 may utilize any communications technology known in the art and the signal 324 may follow any protocol known in the art. Communications technologies include, but are not limited to, Code Division Multiple Access (CDMA), Personal Communications Service (PCS), Analog Mobile Phone Service (AMPS), Global System for Mobile Communications (GSM), and Time Division Multiple Access (TDMA). Preferably, the base station 306 is operable to receive any or all of the possible communications technologies.

As shown in FIG. 3, the cell phone 322 is traveling in a direction 326. The cell phone 322 is moving in the cell 301 toward the cell 304. As the cell phone 322 travels, it maintains communications with the base station 306 and the cellular processor 310 monitors the strength of the signal 324. As the cell phone 322 moves farther from the base station 306, the cellular processor 310 may detect that the strength of the signal 324 diminishes or weakens. The cell phone 307 travels through the overlapping region 307 where cell 304 and cell 301 overlap. When the signal strength of the signal 324 drops below a minimum power level, the cellular processor 310 accesses a directed retry list (DRL) in a database 328 to determine an available cell face to receive a call from the cell phone 307. The database 328 contains a plurality of DRLs. Each DRL is associated with a cell face at a cell. Preferably each DRL has a cell identifier and a cell face identifier for the associated cell face. The cellular processor 310 reads cell face transfer data entries from the DRL. Each cell face transfer data entry identifies an available transfer cell face that can receive a call from a cell phone.

Cell face transfer data may be updated when a new cell such as cell 304 is implemented. For example, cell 304 and its associated base station 316 may be put into service after the cells 301 and 302 are operating. When the base station 316 is put into service, a plurality of new cell faces associated with base station 316 are made available to offer mobile communication service that was not existent prior to implementation of cell 304. As a result of the implementation of cell 304, data in the databases 328 and 330 may be updated to reflect the addition of cell 304. As an example, a call in cell 301 traveling into cell 304 may be transferred to a cell face of the base station 316. The cellular processor 312 will monitor the mobile telephone user's call for various parameters including signal strength. As the traveler travels from the cell 301 toward the cell 304, the signal strength from the call may diminish. The cellular processor 312 will send a signal to the base station 306 to initiate a transfer to retry the call using a cell face of the base station 316. The cellular processor 310 accesses the cell face transfer data stored in the database 328. The cellular processor 310 uses cell face transfer data in the database 328 to identify cell faces that are available for the call 324 to be transferred to.

As discussed earlier, the cell face transfer data may reside in the database 328 in multiple formats. Each format may be associated with a communications technology. An embodiment of the present invention allows for automatic reconciling of data in one format to the data in another format to ensure that cell face transfer data is the same for different communications technologies being processed by the cellular processor 310. Thus, an embodiment of the present invention may be viewed as a method or system to ensure that cell face transfer data is consistent for different technologies.

Also shown in FIG. 3 is a computer 332 communicating with the cellular processor 310 and the cellular processor 312. The computer 332 implements a reconciliation system in accordance with an embodiment of the present invention. The reconciliation system can automatically update the database 328 and the database 330. The communications channel 334 can be any communications means known in the art. Examples of communications channels include, but are not limited to, Ethernet, telephone lines, or any proprietary communications protocol. A user of the computer 332 can select between the database 328 and the database 330, and access the database to update forms on the database when new cell face transfer data is created. The reconciliation system of computer 332 automatically compares data in one Directed Retry List (DRL) form in the database 328 to data in another DRL form in the database. The reconciliation system can then automatically modify data in either of the DRL forms such that data in the forms match.

Figure 4:
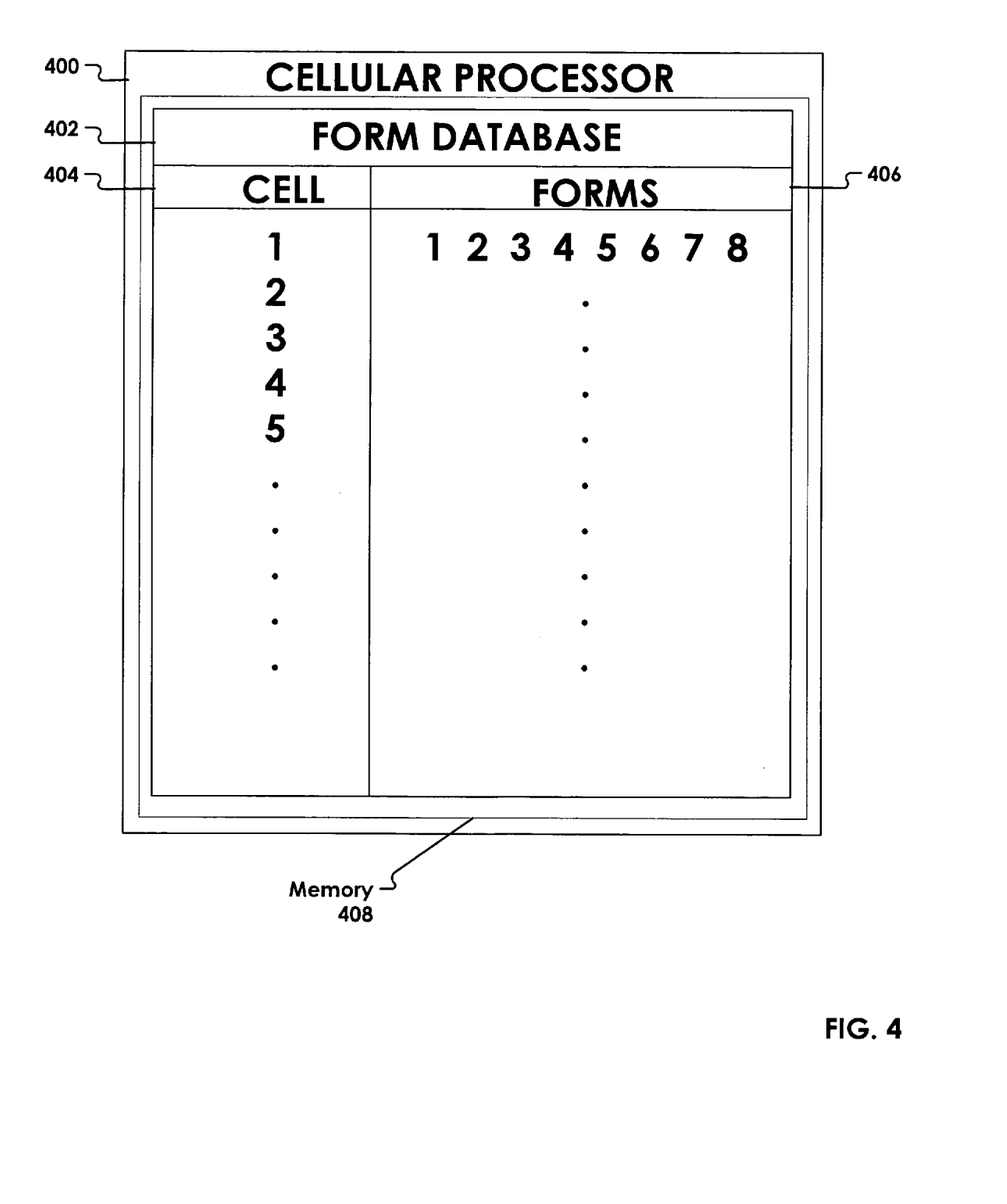
FIG. 4 illustrates an exemplary forms database utilized in the embodiment of the present invention.

FIG. 4 illustrates an exemplary cellular processor including a forms database including cell face transfer data in an exemplary embodiment of the present invention. A cellular processor 400 is depicted having memory 408 wherein database data is be stored. Memory 408 can be any form of storage media known in the art, including, but not limited to random access memory (RAM), read only memory (ROM), electronically erasable programmable read only memory (EEPROM), or flash memory. Also, the form data base 402 can be stored on mass storage devices such as, but not limited to, CD ROM, digital versatile discs (DVD), magnetic cassettes, PCMCIA card memory, or any other medium which can be used to store the desired information and which can be accessed by the cellular processor 400. In general, the form database 402 is a table of binary encoded data that is indexable by cell identification numbers 404. Each cell identification number 404 can identify a physical cell site. Each cell identification number 404 may also identify a cell face of a cell. For each cell identification number 404, a plurality of forms 406 exist in the form database 402. Each form holds a particular kind of data associated with a given cell identification number 404, and preferably can be viewed on a computer monitor.

Figure 5:
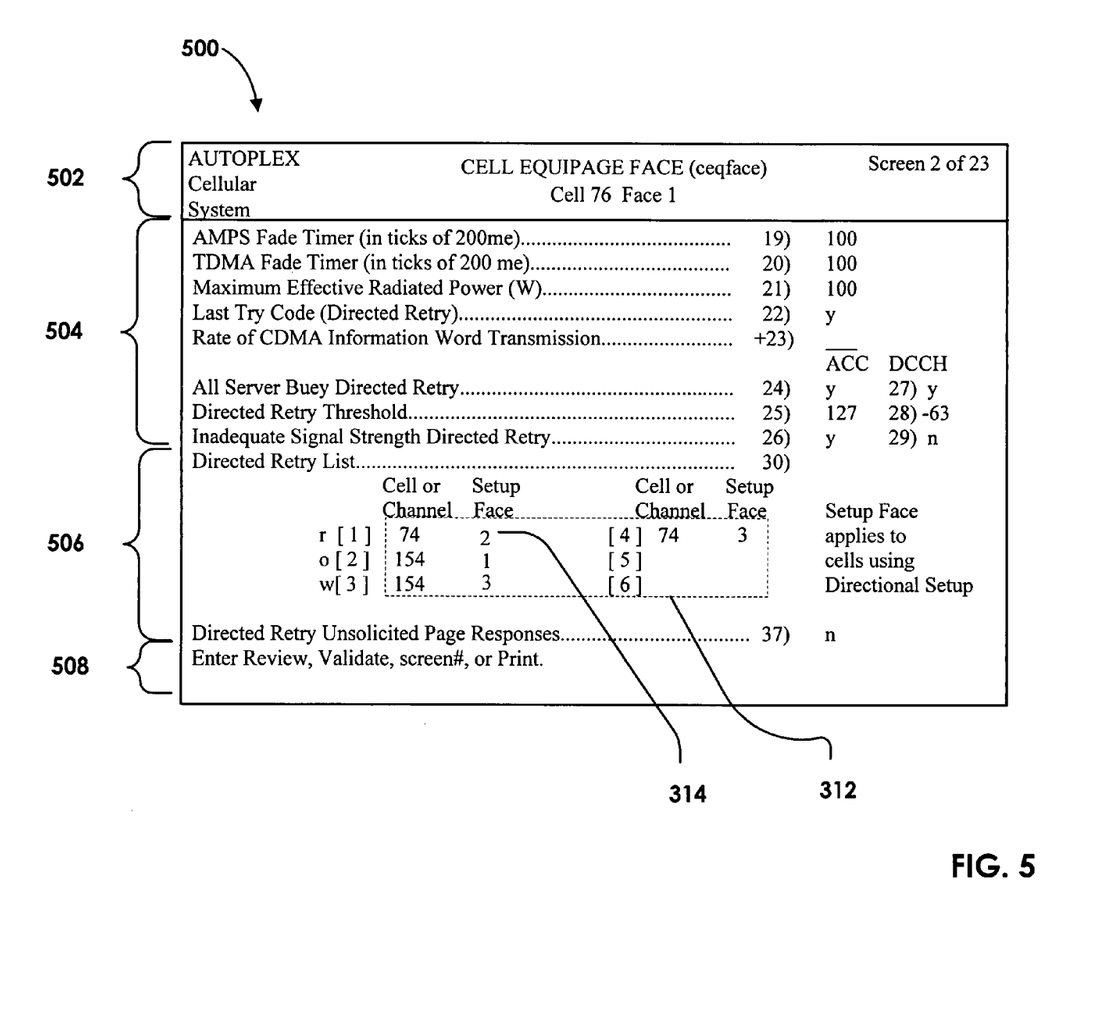
FIG. 5 is an exemplary screen shot presenting data and cell equipage face form utilized in an exemplary embodiment of the present invention.

FIG. 5 is an exemplary screen shot illustrating form data in cell equipage face (CEQFACE) form utilized in an exemplary embodiment of the present invention. A screen shot 500 presents data associated with a cell and cell face. A title section 502 provides a form type, cell equipage face, and the associated cell and cell face identifiers. In the screen shot 500, the cell identifier is 76 and the cell face identifier is 1. Other information is shown in title section 502 that is not necessarily relevant to the present invention. Other data is shown in another data section 504 concerning data such as timers, power, transmission rates, and signal strengths. The data in section 504 is not necessarily relevant to the present invention. The directed retry list (DRL) section 506 presents a directed retry list having cell/cell face identification data associated with cell 76 face 1. Finally a command section 508 provides commands that a user of the form may enter to review and/or process form data.

Most relevant to the present invention is the directed retry list 506 shown in the screen shot 500. As was mentioned, the screen shot 500 provides data associated with cell face 1 of cell 76. The directed retry list 506 provides cell face transfer data 312 associated with cell face 1 of cell 76. Cell face transfer data 312 includes cell/cell face identification data identifying cell faces that are available for transfer from cell face 1 of cell 76 if cell face 1 of cell 76 is not available. For example, cell/cell face identification data 314 indicates that cell face 2 of cell 74 is available for a transfer from cell face 1 of cell face 76. Therefore, when an attempt is made to place a call via cell face 1 of cell 76, the call can be transferred to cell face 2 of cell 74. As was discussed, a cell face typically will not be available to take a call when the call's signal strength does not meet a specified strength or when all radios of the cell face are in use. The cell equipage face form presents a set of cell/cell face identification data 312 in a row format with rows numbered 1–6. A cellular processor such as the cellular processor 222 of FIG. 2, is operable to access a binary encoded form of the cell equipage face data shown in the screen shot 500 and read the cell face transfer data 312 shown in the directed retry list 506. As will be discussed, the cellular processor 222 is further operable to access cell face transfer data in other forms to determine if cell/cell face identifier pairs of the cell equipage face form are in the other forms.

Another form that can be stored in the database is a reselection list (RESEL) form. An exemplary portion of a reselection list form is shown in a partial screen shot 600 illustrated in FIG. 6. Like the screen shot 500 of FIG. 5 for cell equipage face form, the screen shot 600 provides sets of data associated with a cell face of a cell. Some of the data shown in the screen shot 600 for the reselection list form is the same as the data shown in the screen shot 600 for the cell equipage face form, but the data is in a different format for each of the forms. The screen shot 600 includes a title section 602 that provides the type of form, which is reselection list form. Other data is given in the title section 602 but is not necessarily relevant to the present invention. Another section 604 of the screen shot 600 provides a cell number and a face number. The data in section 604 indicates that the reselection list form is associated with cell face 1 of cell 76. In other words, the data presented in the reselection list form of screen shot 600 is relevant to cell face 1 of cell 76. Below the data section 604 a table is presented providing sets of data in a column/row format. Five sets of relevant data 606, 608, 610, 612 and 614 will be discussed in more detail below. Another data section 616 provides additional data such as delay, offset and frequency data, which is not necessarily relevant to this invention.

Figure 6:
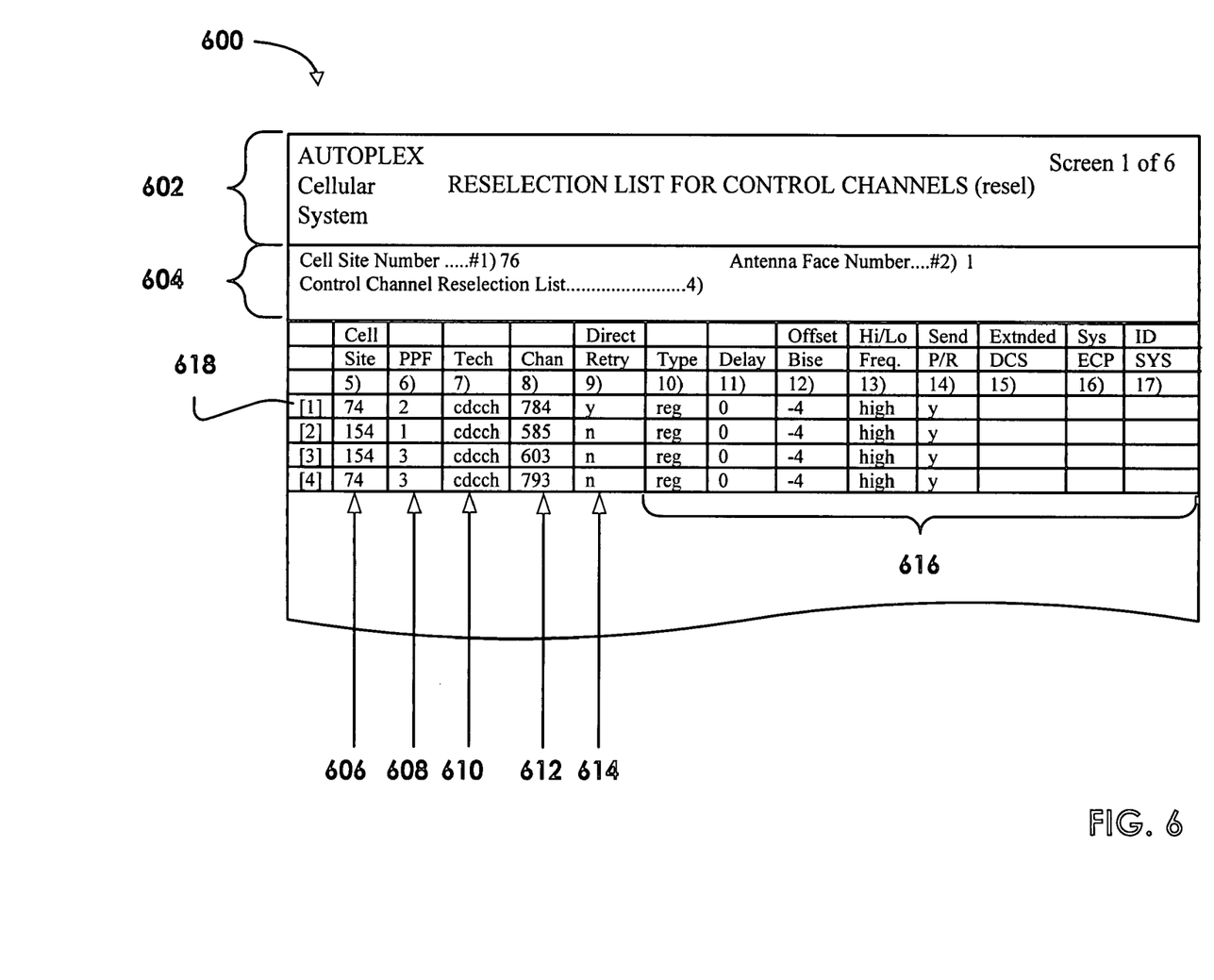
FIG. 6 is an exemplary partial screen shot of data in reselection list form utilized in the embodiment of the present invention.

Cell identifiers 606 identify cells that are available for transfer from cell 76. Cell face identifiers 608 provide the available cell face numbers associated with each of the cell identifiers 606. Technology data 610 provides the particular communications technology or protocol relevant to the reselection list form. Technology indicated in the technology data 610 is digital control channel, which is commonly used in most digital cellular, TDMA, and PCS systems. The technology data 610 indicates that cells indicated in 606 and the cell faces in 608 utilize a digital channel technology. The channel data 612 provides channel frequencies utilized by the associated cell and cell face. A directed retry list 614 indicates whether the cell faces of cell face data 608 are available for a transfer from cell face 1 of cell 76. The reader will recognize that the directed retry list 614 provides cell face transfer data in a format different than the directed retry list 506 of FIG. 5. The directed retry list 614 indicates whether associated cell of cell data 606 and cell face of cell face data 608 is available for a transfer by using a "yes" or "no" indicator. For example, row 618 lists cell 74 and cell face 2 in cell data 606 and cell face 608 respectively. Row 618 has data indicating that cell face 2 of cell 74 is of a digital technology as given in the technology data 610. The cell face 2 of cell 74 further has a channel frequency of 784 as indicated by channel frequency data 612. The directed retry list 614 indicates that cell face 2 of cell 74 is available for a transfer from cell face 1 of cell 76.

Figure 7:
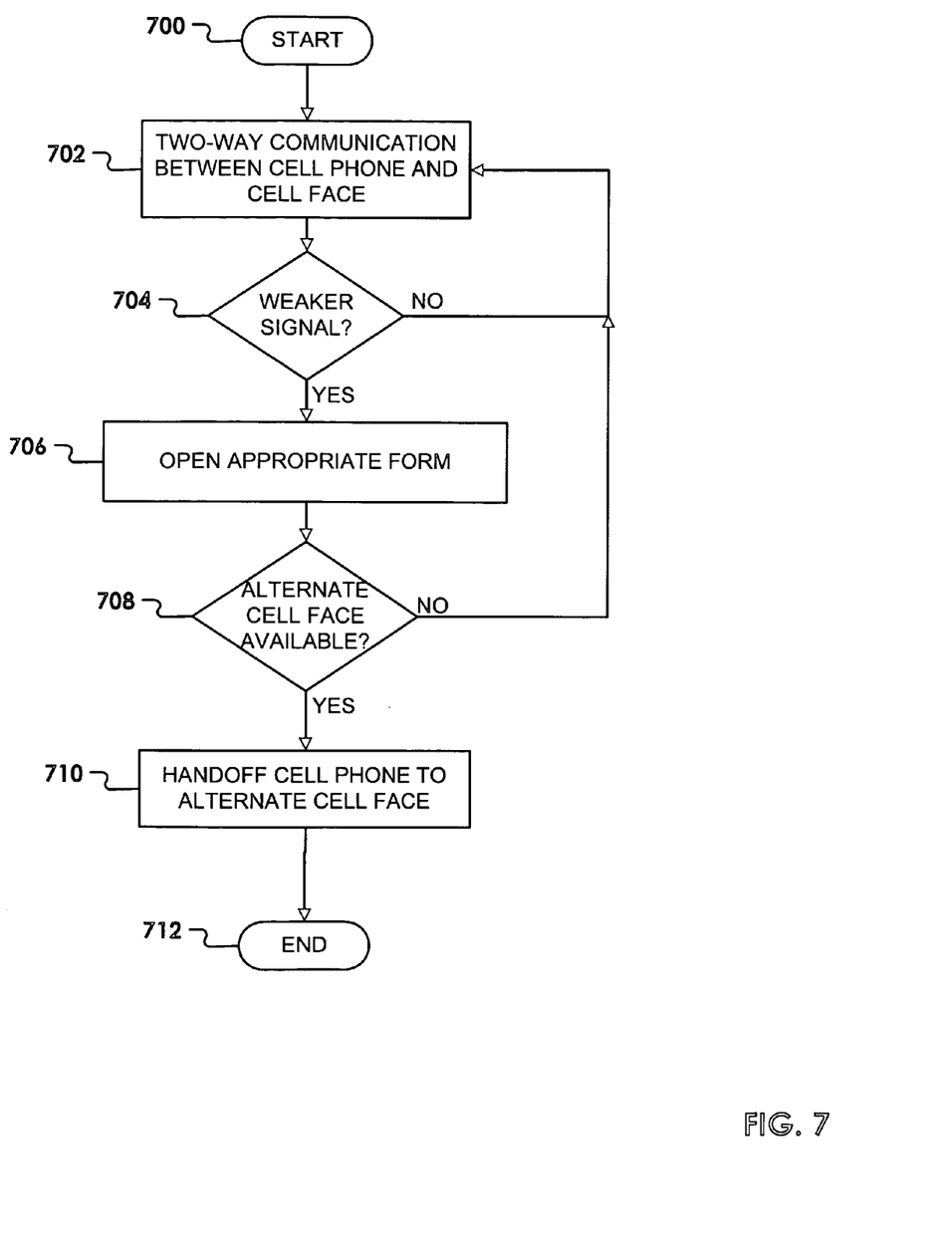
FIG. 7 is a flow chart illustrating a method of utilizing reconciled data in an embodiment of the present invention.

FIG. 7 is a flow chart illustrating an exemplary method of utilizing reconciled cell face transfer data in an embodiment of the present invention. Control initially transfers to a start operation 700 wherein any start-up processing occurs. Control then transfers to a 2-way operation 702 wherein 2-way communication is established between a cell phone and a cell face. As was discussed earlier, establishing 2-way communication typically involves the cell phone receiving a control signal from one or more cell faces and choosing a control signal that is the strongest. After receiving the control signal, the cell phone begins transmitting at a frequency associated with the cell face. Control then transfers to a query operation 704 wherein it is determined whether the signals from the cell phone are becoming weaker. As has been discussed, determining the power of the cell phone signal typically involves a cellular processor monitoring the power of the signal periodically. If it is determined that the power of the signal is not weakening, the control transfers back to the 2-way operation 702 wherein the 2-way communication continues. If, on the other hand, it is determined that the signal is weakening, control transfers to an opening operation 706 wherein a form is opened on a database to identify another cell face for receiving the phone signal. In the opening operation 706, it is first determined which of a number of forms is appropriate given the type of signal received from the cell phone. This typically involves the cellular processor identifying communication protocol that is being utilized and selecting the corresponding form in the database from which to retrieve a list of available cell faces. Control then transfers to a query operation 708 wherein it is determined an alternative cell face is available. Determining whether an alternative cell face is available typically involves accessing the list of cell sites/cell face pairs from a form in the database. If no alternative cell face is available, control transfers back to the 2-way operation 702 wherein 2-way communication continues. If an alternative cell face is available, control transfers to a transfer operation 710 wherein the cell phone signal is transferred to the alternative cell face. Transferring the cell phone call typically involves adding information to the control channel that is transmitted to the cell phone instructing the cell phone to begin transmitting in an alternative frequency associated with the alternative cell face. After the cell phone signal has been transferred to the alternate cell face, control transfers to an end operation 712 wherein the transfer operation terminates.

Figure 8:
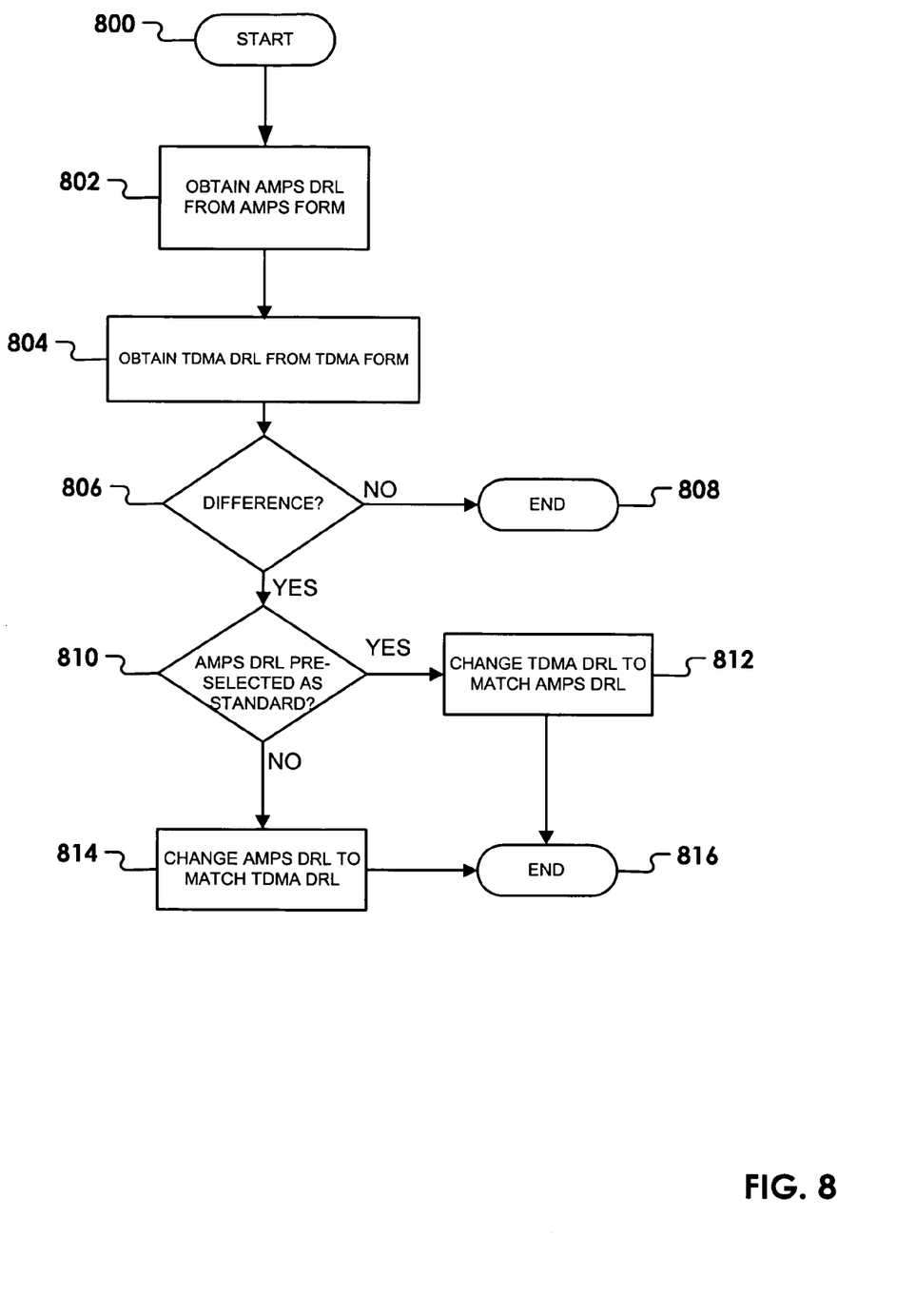
FIG. 8 is a flow chart illustrating an exemplary method of reconciling directed retry list forms.

FIG. 8 is a flow-control diagram in an exemplary embodiment of the present invention. Control initially transfers to a start operation 800 wherein initialization processing occurs. Control then transfers to an obtaining operation 802 wherein directed retry list (DRL) data is obtained from an advanced mobile phone system (AMPS) form. Control then transfers to and obtaining functions 804 wherein DRL data is obtained from a time division multiple access (TDMA) form. Control then transfers to a query operation 806 wherein it is determined whether the AMPS DRL data is different from the TDMA DRL data. If the two different forms of data are not different, control transfers to an end operation 808 wherein processing ends. If there is a difference between the two different forms of DRL data, control transfers from the query operation 806 to a query operation 810. In the query operation 810, it is determined whether the AMPS DRL data has been preselected as standard DRL data. Thus, the embodiment illustrated in FIG. 8 provides for reconciling TDMA DRL data to match AMPS DRL data, or reconciling AMPS DRL data to match TDMA DRL data. If in the query operation 810 it is determined that the AMPS DRL data is the standard DRL data, control transfers to a changing operation 812. In the changing operation 812, the TDMA DRL data is changed to match the AMPS DRL data. The changing operation 812 reconciles the TDMA DRL form with the AMPS DRL form. If, on the other hand, in the query operation 810, it is determined that the AMPS DRL data is not standard, control transfers to a changing operation 814. In the changing operation 814, the AMPS DRL form is changed to match the TDMA DRL form. The changing operation 814 reconciles the AMPS DRL form with the TDMA DRL form. After both changing operations 812 and 814, control transfers to an end operation 816 when processing terminates.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of reconciling first format receiver transfer data with second format receiver transfer data, wherein format receiver transfer data designates available cell faces used to transfer a call between cell faces at one or more cell sites, comprising:

comparing a first format entry of the first format receiver transfer data to a second format entry of the second format receiver transfer data;

automatically modifying the first format entry if receiver transfer data of the second format entry is not included in the first format entry;

wherein the first format entry is a first directed retry list and the second format entry is a second redirected retry list, the first and second directed retry lists comprise cell face identification data identifying available transfer receivers and comparing comprises:

selecting a cell site and an associated cell face;

reading first cell face identification data from the first directed retry list associated with the selected cell site and cell face;

reading second cell face identification data from the second redirected retry list associated with the selected cell site and cell face; and comparing the first identification data to the second cell face identification data.

2. The method of claim 1 wherein modifying-comprises:

adding the first cell face identification data to the second directed retry list.

3. The method of claim 2 wherein the first directed retry list is a Cell Equipage Face form and the second directed retry list is a Reselection List form and adding the cell face identification data comprises:

replacing a no indicator with a yes indicator in the Reselection List form.

* * * * *